Feb. 22, 1927.

F. R. PORTER 1,618,603

INTERNAL COMBUSTION ENGINE

Filed Nov. 25, 1924

INVENTOR
Finley R. Porter
BY
ATTORNEYS

Patented Feb. 22, 1927.

1,618,603

UNITED STATES PATENT OFFICE.

FINLEY R. PORTER, OF NEW YORK, N. Y., ASSIGNOR TO PORTER ENGINE DEVELOPMENT, INC., OF NEW YORK, N. Y., A CORPORATION OF NEW YORK.

INTERNAL-COMBUSTION ENGINE.

Application filed November 25, 1924. Serial No. 752,155.

My invention relates to internal combustion engines and is shown in connection with an internal combusion engine of the rotary valve type in which the cylinder has a common inlet and discharge port, the valve chest has separate inlet and discharge ports and the valve has a peripheral bridge port located in the same plane as the cylinder and valve chest ports.

The object of my invention is to provide a novel packing engaging the valve around the cylinder port for preventing leakage, for ensuring the proper lubrication of the parts and for providing sufficient pressure of the sealing ring on the valve to obtain a gas tight engagement without too much friction.

A practical embodiment of my invention is represented in the accompanying drawings, in which—

Figure 1:
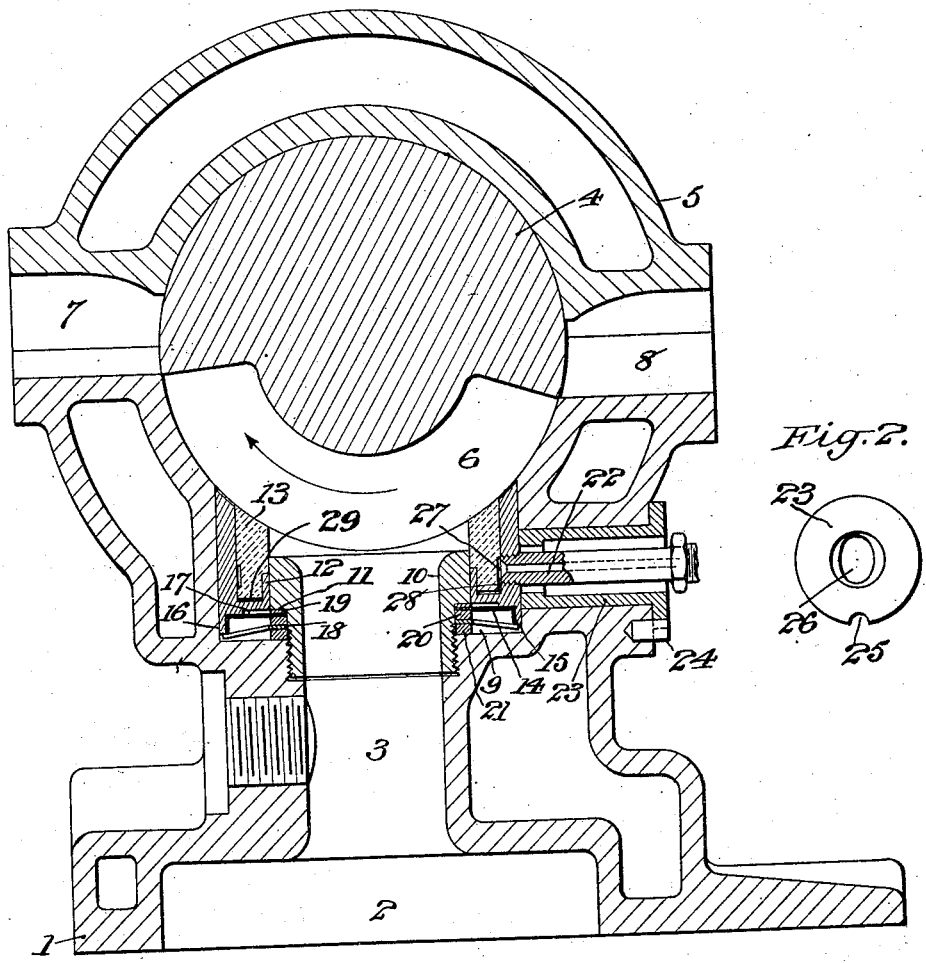
Fig. 1 represents a vertical cross section through so much of an internal combustion engine of the rotary valve type as includes my invention.
Figure 2:
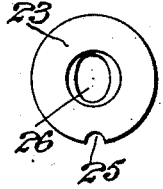
Fig. 2 represents an end view of the oil supply tube receiving sleeve.
Figure 3:
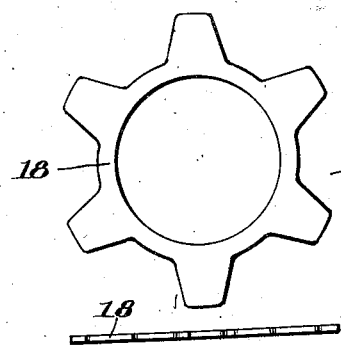
Fig. 3 represents face and edge views of the packing advancing spring.

The cylinder is denoted by 1, the combustion chamber by 2 and the cylinder port by 3. The valve 4 is rotatably mounted in the valve chest 5 and is provided with a peripheral bridge port 6. The valve chest is provided with a motive fluid inlet port 7 and exhaust port 8. The bridge port 6 in the rotary valve 4 is located in the same plane as the cylinder port 3, the inlet port 7 and the exhaust port 8.

The cylinder 1 is provided with an annular packing chamber 9 around the port 3, opening to the face of the rotary valve 4. A cylinder ring 10, located in the packing chamber 9, is screwed into the walls of the cylinder port 3, the bore of which ring forms a continuation of said port. This cylinder ring 10 is provided with a circumferential shoulder 11 at the base of its screw-threaded portion.

The annular packing which surrounds the cylinder port within the packing chamber 9 comprises an annular holder 12 and its removable sealing ring 13, which sealing ring is composed of an oil impregnated self-lubricating bearing material such, for instance, as "Genalite". The inner and outer walls of the sealing ring holder slidably fit the inner and outer side walls of the packing chamber.

The means which I have provided for preventing the leakage of gas around the cylinder port 3 and for holding the sealing ring 13 of the packing against the face of the rotary valve 4 with the required amount of pressure, is constructed and arranged as follows:

An annular diaphragm 14 of thin resilient material surrounds the cylinder ring 10 within the packing chamber 9 and has its laterally turned outer edge 15 engaged with and preferably permanently united to the flange 16 around the bottom of the annular sealing ring holder 12 to form a gas tight joint. The inner edge of the diaphragm is engaged with the cylinder 1 as, for instance, by being clamped between the shoulder 11 of the cylinder ring 10 and the bottom of the packing chamber 9 to form a gas tight joint. This resilient diaphragm 14 traps any gas which passes between the adjacent walls of the cylinder ring 10 and the sealing ring holder 12 in the shallow recess 17 in the bottom of the holder.

The packing advancing spring 18 comprises an exteriorly pronged washer of resilient material surrounding the cylinder ring 10, within the annular packing chamber 9, the inner edge of which spring washer is clamped between the bottom of the chamber 9 and the shoulder 11 of the cylinder ring and the prongs of which spring bear against the sealing ring holder flange 16, said prongs being deflected sufficiently to press the packing upwardly to hold the sealing ring against the face of the valve 4 with the desired amuont of force.

Suitable spacing washers 19, 20, 21 surround the cylinder ring 10 between the shoulder 11 and bottom of the chamber 9 for suitably spacing the diaphragm and spring.

Means are provided for supplying oil to the sealing ring 13 to keep the ring, at all times, impregnated, said means being herein shown as comprising an oil supply pipe 22 screwed into the outer wall of the sealing ring holder 12, which pipe passes through the bore of a sleeve 23 inserted into the cylinder 1 and held against rotative movement by a pin and recess connection 24, 25. The inner end of this sleeve has an elongated slot 26 for allowing a slight movement of the oil supply pipe with the packing as the packing is fed up to the face of the rotary valve. The bore of the oil supply pipe 22 opens into a circumferential groove 27 in the sealing ring 13, a longitudinal passage 28 in the sealing ring being provided for bringing the space 29 between the bottom of the sealing ring and the holder into communication with the groove 27. Thus an ample amount of oil may be supplied to the sealing ring to keep it, at all times, suitably impregnated.

From the above description it will be seen that I have provided a packing in which the sealing ring of self-lubricating bearing material is kept impregnated with lubricating oil from an external source of supply. It will also be seen that separate spring means are employed to hold the packing against the valve. It will also be seen that by connecting the outer and inner edges of the diaphragm with gas tight joints to the cylinder and packing, respectively, all gas pressure leakage from the cylinder port between the cylinder ring and packing passes to the chamber between the packing and diaphragm when it is trapped and used to exert its force to press the packing against the valve, it being understood that zero pressure is maintained in the packing chamber below the diaphragm.

It is evident that various changes may be resorted to in the construction, form and arrangement of the several parts without departing from the spirit and scope of my invention; hence, I do not wish to limit myself to the particular embodiment herein shown and described, but

What I claim is:

1. In an internal combustion engine, a rotary valve, a packing therefor including a sealing ring of self-lubricating bearing material, and means for supplying oil thereto to keep the ring oil impregnated.

2. In an internal combustion engine, a rotary valve, a packing therefor including a sealing ring of self-lubricating bearing material, means for supplying oil thereto, to keep the ring oil impregnated, and spring means for holding the sealing ring against said valve.

3. In an internal combustion engine, a rotary valve, a packing therefor including a sealing ring of self-lubricating bearing material, means for supplying oil thereto, a diaphragm engaging the cylinder and packing, and separate spring means for holding the sealing ring against said valve.

4. In an internal combustion engine, a rotary valve, a cylinder having a port and a packing chamber surrounding it, a packing in said chamber comprising a sealing ring of self-lubricating bearing material, a holder therefor, means for supplying oil to the sealing ring, and a diaphragm in said chamber engaging the cylinder and holder.

5. In an internal combustion engine, a rotary valve, a cylinder having a port and a chamber surrounding it, a packing in said chamber, means for supplying oil to the packing, a diaphragm in said chamber engaging the cylinder and packing, and a spring located in said chamber for holding the packing against said valve.

6. In an internal combustion engine, a rotary valve, a cylinder having a port and a packing chamber surrounding it, a packing in said chamber comprising a sealing ring of self-lubricating bearing material and a holder therefor, means for supplying oil to the sealing ring, a diaphragm in said chamber engaging the cylinder and holder, and a spring located in said chamber for holding the sealing ring against said valve.

7. In an internal combustion engine, a rotary valve, a cylinder having a port and a chamber surrounding it, a packing within said chamber comprising a sealing ring of self-lubricating bearing material and a holder therefor, a space being formed between the bottom of the sealing ring and the holder and the sealing ring having a circumferential groove communicating with said space, and means for supplying oil to said groove and space for absorption by said sealing ring.

8. In an internal combustion engine, a rotary valve, a cylinder having a port and a chamber surrounding it, a packing within said chamber, a diaphragm in said chamber having one edge permanently joined to the packing to form a gas tight joint and its other edge engaged with the cylinder to form a gas tight joint, a spring located in said chamber for holding the packing against said valve, and means for supplying oil to the packing.

9. In an internal combustion engine, a rotary valve, a cylinder having a port and a packing chamber surrounding it, a packing in said chamber comprising a sealing ring of self-lubricating bearing material and a holder therefor, means for supplying oil to the sealing ring, a diaphragm in said chamber having one edge permanently joined to the holder with a gas tight joint and its other edge engaging the cylinder with the gas tight joint, and a spring located in said chamber for holding the sealing ring against said valve.

In testimony that I claim the foregoing as my invention, I have signed my name this 21st day of November 1924.

FINLEY R. PORTER.